Sept. 10, 1929.  F. ATHIMON  1,727,741
VEHICLE BRAKE
Filed March 20, 1925  3 Sheets-Sheet 2
Fig.6
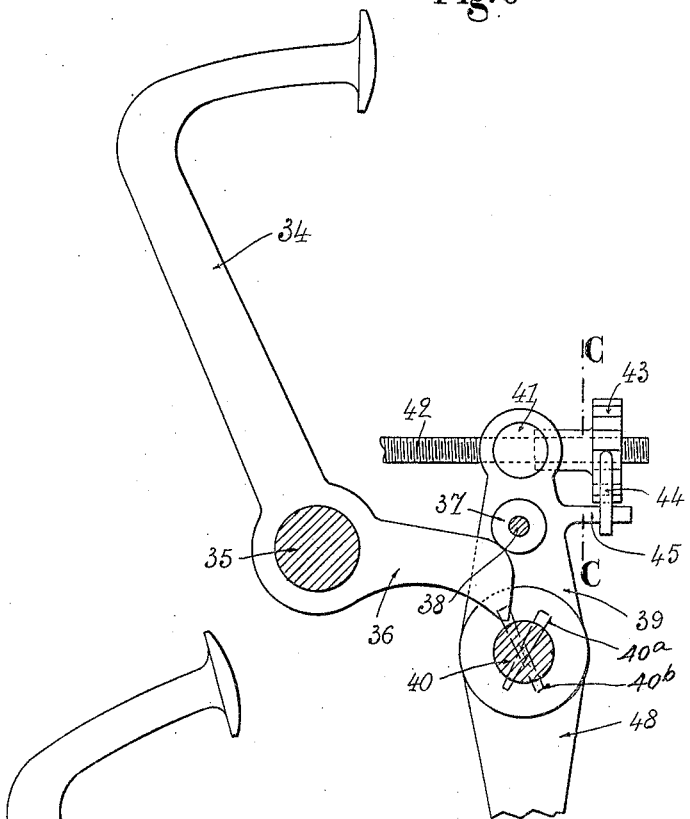
Fig.7
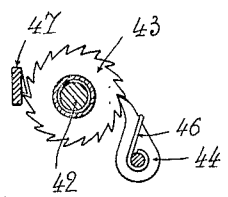
Fig.8
Fig.9
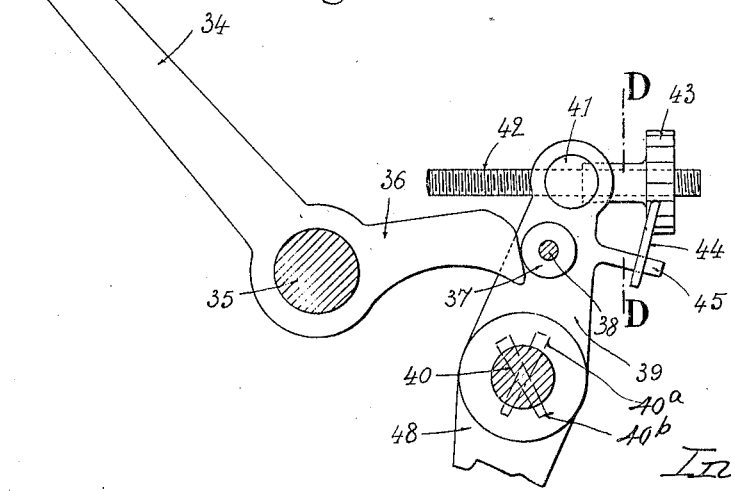
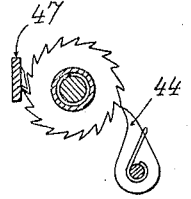
Inventor
F. Athimon
By Marks & Clerk Sept. 10, 1929.  F. ATHIMON  1,727,741
VEHICLE BRAKE
Filed March 20, 1925   3 Sheets-Sheet 3
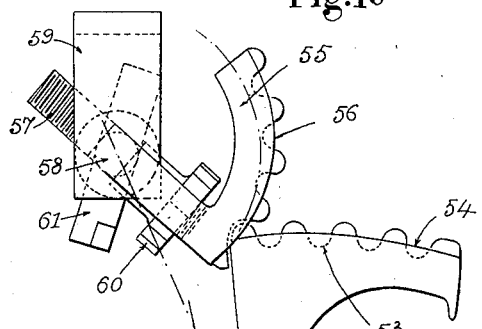
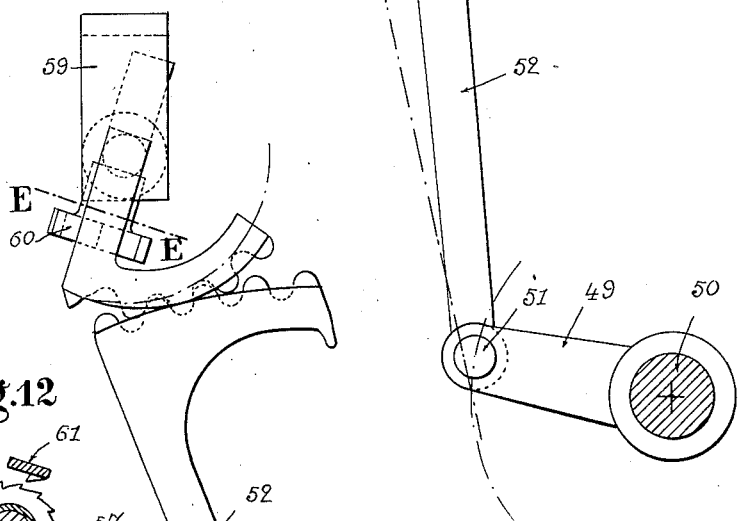
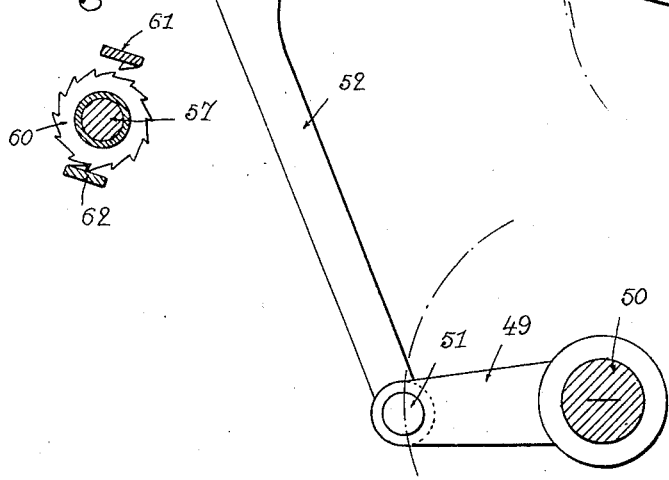

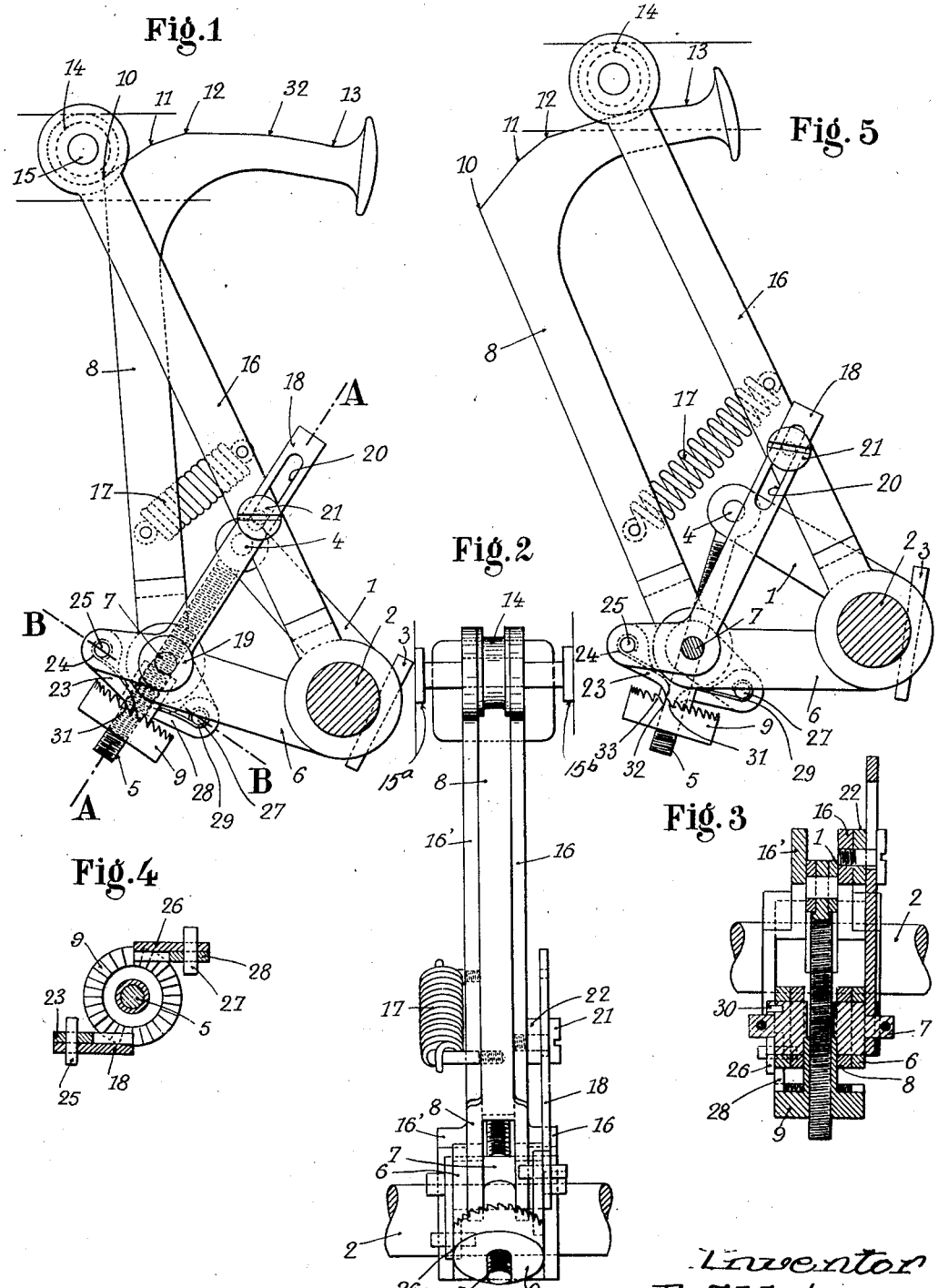

Patented Sept. 10, 1929.

1,727,741

UNITED STATES PATENT OFFICE.

FRANCIS ATHIMON, OF PARIS, FRANCE.

VEHICLE BRAKE.

Application filed March 20, 1925, Serial No. 17,055, and in France March 29, 1924.

In certain motor vehicles, and chiefly the heavy vehicles, which are provided with brakes upon the four wheels, the effort which is required for the simultaneous braking of the wheels to the maximum degree will much exceed what the driver may be called upon to furnish. Since the brake control has but a limited motion, it is impossible to provide for a multiplication of the driver's effort. In the total stroke of the brake pedal or lever, if some 48 per cent of the stroke is for example employed during the preliminary or free stroke to take up the space between the brake shoes and the brake drum the remainder or 52 per cent represents the working stroke, i. e. the stroke for taking up the wear. Should the normal multiplication of the driver's effort, be doubled, for example, while the free stroke remains obviously the same, it will be necessary to employ 96 per cent of the whole stroke for effecting the free stroke, leaving but 4 per cent for taking up the wear, so that a constant adjustment of the parts will be required. Also, the rapidity of the braking action will be reduced.

The above considerations have led to the use of servo-brakes in which the braking effort is furnished by the kinetic energy of the vehicle, but this method is subject to certain drawbacks, for the cost of the device is relatively high, and the brakes usually cannot be employed for the back motion of the vehicle.

The device according to my invention provides for the maximum braking upon the four wheels, even for the heaviest vehicles, by the sole action of the driver and by a relatively easy effort. The said apparatus is simply constructed and at a small cost, and the braking can be performed in all directions and is at the same time very responsive.

It may further be employed upon small vehicles, and the controlling effort is thus very easy and the device will require less adjustment than usual.

The arrangement according to my said invention consists of a device which is mounted at any suitable point upon the brake control and comprises a cam or like member actuated by the driver and acting in turn upon the brake drums; said cam imparts a relatively rapid motion for the free stroke and a much slower motion for effecting the braking, so that the ratio of the increase is much greater for the actual braking than for the free stroke; a period during which a ratio intermediate between these two values can be provided, for the flexion or elasticity of the rod and link gear of the vehicle. The compensation for the wear is effected by a pawl device which acts during the return of the control of the initial position when the pedal stroke has exceeded a given amplitude.

In the appended drawings which show by way of example various embodiments of the invention:

Fig. 1 is an elevational view of a brake pedal mounted on the brake control shaft and in the inoperative position, and Fig. 2 is the corresponding rear view.

Fig. 3 is a section on the line A—A of Fig. 1, and

Fig. 4 a section on the line B—B of the same figure showing the adjusting nut, its pawls and their support.

Fig. 5 is an elevation of the pedal in the operative position.

Fig. 6 is an elevation of a modification, with the pedal in the inoperative position, and Fig. 7 is a section on the line C—C of Fig. 6.

Fig. 8 shows the device according to Fig. 6 in the operative position, and

Fig. 9 is a section on the line D—D of Fig. 8.

Fig. 10 is an elevation of another modification, in the inoperative position, and Fig. 11 is the corresponding view in the operative position.

Fig. 12 is a section on the line E—E of Fig. 11.

Referring to Figs. 1 to 5, 1 is a small lever which is fitted upon the shaft 2 controlling the rod and link gear of the brake, and is secured thereto by the pin 3. At the end of said lever is a fork which is pivoted to the screwthreaded rod 5 by means of the pin 4. A second lever 6 is loosely mounted on the shaft 2 on either side of the lever 1, and has at the end a fork to which is pivoted, by the axle 7, the pedal 8 which is provided with a corresponding forked end. The lever 1 is connected with the lever 6 by the screwthreaded rod 5 which extends loosely through an aperture in the axle 7 and is provided with a ratchet-shaped nut 9. At the upper part of the pedal 8 is provided a cam portion having different outlines 10—11, 11—12, 12—13 co-operating with the roller 14 which is mounted on the axle pin 15 which latter is carried by the supports 16 and 16′ which are loosely mounted on the shaft 2 at the end farthest from the roller, but whose end carrying the roller is rigidly secured to suitable points for instance 15$^a$ and 15$^b$ on the vehicle frame. A spring 17 connects the support 16′ with the pedal 8 and ensures the back motion of the latter. On one end of the axle 7 is mounted a pivoted member 18 which is held thereon by the washer 19 and a suitable cross-pin. In one end of the member 18 is formed the slot 20 through which extends a screw 21; said screw and the washer 22 serve to hold the said member, Fig. 3; at the other end of the said member 18 is pivoted, on the axle pin 25 an adjusting pawl 23 which is urged by the spring 24 into contact with the teeth of the ratchet nut 9. On the other end of pin 7, and secured by the pin 30, is mounted a member 26 upon which is pivoted (on the axle pin 27) a stop pawl 28 which is urged upon the ratchet nut 9 by the spring 29.

The said arrangement is operated as follows:

As above stated, the upper part of the pedal 8 comprises cam portions consisting of three ramps having different slopes, 10—11, 11—12, 12—13. When pressure is exercised upon the pedal 8 to rock the latter, the first ramp 10—11 will move below the roller 18, and will cause a rapid lowering of the pedal and axle pin 7 and also—through the medium of the screwthreaded rod 5 and the lever 1—a corresponding rotation of the shaft 2, and due to this motion, the preliminary or free stroke of the brake can be rapidly effected; the second ramp 11—12 takes up somewhat more slowly (and in like conditions) the stroke which may be made necessary in virtue of the flexion or elasticity of the rod and link gear in certain cases; the third ramp 12—13 provides for the high increasing ratio of the driver's effort and acts for the working stroke or braking proper so called, from its starting point 12 onward.

It will be noted that while the latter ramp provides for a high increasing ratio of effort, the stroke for taking up the wear which it will afford to the levers 1 and 6 will be relatively small, so that I further employ a wear compensating system which is operated as follows (Fig. 1): Taking into consideration the position of the adjusting pawl 23 relatively to the tooth 31 of the ratchet nut 9, and supposing that due to the wear of the brake facings the pedal 8 can bring said pawl for example to the point 32 (Fig. 5), the said pawl will attain the top of the tooth 31, and if the pedal is brought back into the inoperative position at this time, no adjustment will have been effected, and the said pawl 23 and the tooth 31 will resume the position of Fig. 1. But if the wear is such that the pawl will proceed forwardly of the point 32 (Fig. 5) it will drop upon the tooth 33; the pedal being brought back the pawl will first take up the play represented by the space between the teeth, and will then act upon the tooth 31 and will drive back the said nut by one tooth, and this action—through the medium of the rod 5—will compensate for the wear of the brakes. In the subsequent braking action, the pawl will stop at a point situated forwardly of the point, 32, and will then, according to the wear, pass beyond this point and will again act to perform the adjustment. After the said pawl has passed beyond one tooth and upon returning to the inoperative position, the inoperative stroke which it makes in order to take up the play represented by the space between the teeth may coincide with the return of the ramps 10—11 and 11—12 below the roller 14, and in this manner the nut 9 will be acted upon solely at the time when the only traction thereon as well as upon the rod 5 is the traction due to the reaction springs The stop pawl 28 acts upon the said nut in order to lock the same and to prevent unscrewing.

In the modification shown in Figs. 6, 7, 8 and 9, the pedal 34, Fig. 6, is pivoted on the shaft 35 and comprises an arm 36 having at its end various cam outlines co-operating with the roller 37 which is mounted upon the spindle 38 secured to the lever 39. The latter is mounted on the shaft 40 and is secured thereto by a pin 40$^a$; it is provided at its upper end with a fork carrying the axle pin 41; the rod 42 extends loosely through the said axle pin and is screwthreaded upon a certain length, it being held by the ratchet nut 43. The rod 42 serves for example for the control of the front wheel brakes; a regulating pawl 44 is mounted on the arm 45 of the lever 39, and is provided with a spring 46. The said nut is stopped by the spring 47 which serves as a pawl and is mounted on the axle pin 41 (Fig. 7). A lever 48 for the rear brake control is secured by a pin 40$^b$ to the shaft 40 and comprises suitable members corresponding to those upon the lever 39, with the exception of the roller 37.

The said modified arrangement is operated in the same manner as the device shown in Figs. 1 to 5. The arm 36 comprises in fact the cam outlines corresponding to those upon the pedal 8 in the preceding figures.

Another modified arrangement is shown in Figs. 10, 11 and 12 in which a lever 49 is secured by a pin to the shaft 50; to its outer end is pivoted the pedal 52, upon the spindle 51. The upper part of said pedal has the form of a toothed sector 53, and parallel to the toothed portion is mounted a smooth sector 54. The said sectors co-operate respectively with the toothed sector 55 and the smooth sector 56 which are secured to the screwthreaded rod 57 extending loosely through the spindle 58 mounted in the fork 59, said rod being held by a ratchet nut 60.

The sectors 55 and 56 are rotatable on the spindle 58, but are eccentered with respect to the same, thus acting in the same manner as the cams shown in the preceding examples. An adjusting spring pawl 61 is mounted on the fork 59, and a like pawl 62 on the spindle 58 (Fig. 12).

In this device the free stroke can be rapidly effected by the double pivot joint formed by the screwthreaded rod 57 and the pedal 52, as far as the point 63 which is near the dead centre, and the ratio of the effort for the braking can then be increased due to the rolling of the smooth sector 54 on the like sector 56. The pawl 61 comes into action when the brake control is being brought into the inoperative position, should the pedal have been rocked beyond the point corresponding to 63, Figs. 11 and 12. The pawl 62 serves to lock the nut 60.

Obviously, the forms of construction hereinbefore described are given solely by way of example, and other embodiments of the invention may be provided without departing from the principle of the invention.

Having now described my invention, what I claim as new and desire to secure by Letters Patent is:

1. In a vehicle brake control the combination of a lever, means for operatively connecting said lever with the braking members, a cam member, means whereby said cam member is adapted to rock said lever and to impart to the same successive different speeds during each rocking motion, either of said means comprising a member of adjustable length, operating means actuated by the driver for operating said cam member and means controlled by said operating means for automatically adjusting the length of said member of adjustable length whereby the wear of the braking members is automatically taken up.

2. In a vehicle brake as claimed in claim 1 the further feature residing in that said member of adjustable length and the means for adjusting its length consist of a screwthreaded rod, a ratchet nut screwed to said rod and whereby said rod is connected to the adjacent member, a pawl adapted to cooperate with said ratchet nut and means for operatively connecting said pawl with said cam operating means and whereby said ratchet nut is rotated when the stroke of said cam operating means exceeds a predetermined value and during the return motion of said means.

3. In a vehicle brake control the combination of two stationary shafts, a control member and a lever respectively mounted on said shafts, a cam profile having successive ramps of decreasing slope provided upon an extension of said control member and adapted to rotate said lever with successively decreasing angular speeds, means for operatively connecting said lever with the braking members and whereby the wear of said braking members is taken up automatically when the stroke of said lever exceeds a predetermined value.

4. In a vehicle brake as claimed in claim 3 the further feature residing in that said connecting means comprise a screwthreaded rod operatively connected with the braking members, a ratchet nut screwed to said rod and adapted to transmit the thrust from the lever to the threaded rod and a pawl pivoted to said lever and adapted to rotate said ratchet nut during the return stroke of said lever when said stroke exceeds a predetermined value.

5. In a vehicle brake control, the combination of a shaft, a rocking lever on said shaft, operating means actuated by the driver for operating said lever, a screwthreaded rod operatively connected to the braking members, a ratchet nut directly screwed upon said screwthreaded rod and adapted to transmit the thrust from the lever to the screwthreaded rod and a pawl pivoted to said lever and positively connected with said lever so as to follow every movement of said lever and adapted to snap over the teeth of said ratchet nut when said lever is operated by the driver and to rotate said ratchet nut when said lever returns to its idle position.

In testimony whereof I have signed my name to this specification.

FRANCIS ATHIMON.